United States Patent
Ko et al.

(10) Patent No.: US 7,310,365 B2
(45) Date of Patent: Dec. 18, 2007

(54) GROUP DECISION RULE IN CODE TRACKING USING A DELAY LOCK LOOP (DLL)

(75) Inventors: Young-Chai Ko, San Diego, CA (US); Gibong Jeong, San Diego, CA (US); Yuan Kang Lee, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 744 days.

(21) Appl. No.: 10/699,219

(22) Filed: Oct. 31, 2003

(65) Prior Publication Data

US 2005/0094710 A1    May 5, 2005

(51) Int. Cl.
*H04B 1/707* (2006.01)
(52) U.S. Cl. .................. 375/145; 375/147; 375/149; 375/316; 375/152; 375/347
(58) Field of Classification Search .............. 375/150, 375/130, 347, 145, 152, 343
See application file for complete search history.

(56) References Cited

U.S. PATENT DOCUMENTS

| | | | | |
|---|---|---|---|---|
| 5,987,016 A | * | 11/1999 | He | 370/335 |
| 6,078,611 A | * | 6/2000 | La Rosa et al. | 375/147 |
| 6,785,321 B1 | * | 8/2004 | Yang et al. | 375/137 |
| 6,873,826 B2 | * | 3/2005 | Becker | 455/67.11 |
| 2002/0044592 A1 | * | 4/2002 | Razzell | 375/148 |
| 2002/0061056 A1 | * | 5/2002 | Smolyar et al. | 375/150 |
| 2003/0186714 A1 | * | 10/2003 | Vihriala | 455/506 |
| 2003/0235238 A1 | * | 12/2003 | Schelm et al. | 375/148 |
| 2004/0013218 A1 | * | 1/2004 | Kouyama | 375/376 |

* cited by examiner

*Primary Examiner*—Chieh M. Fan
*Assistant Examiner*—Siu M Lee
(74) *Attorney, Agent, or Firm*—Ronald O. Neerings; Wade James Brady, III; Frederick J. Telecky, Jr.

(57) ABSTRACT

System and method for code acquisition in a wireless communications system with a delay lock loop. A preferred embodiment comprises assigning a delay lock loop (DLL) to each path in a received signal with multipath, adjusting each DLL to maximize sample strength, grouping samples that are less than a first threshold apart into groups, adjusting DLL timing of samples in groups, regrouping groups that are less than a second threshold apart, applying a group decision to regrouped groups, and repeating the regrouping and applying until all groups are greater than the second threshold apart.

33 Claims, 4 Drawing Sheets

GROUP DECISION RULE IN CODE TRACKING USING A DELAY LOCK LOOP (DLL)

TECHNICAL FIELD

The present invention relates generally to a system and method for digital communications, and more particularly to a system and method for code acquisition in a wireless communications system with a delay lock loop.

BACKGROUND

In a wireless communications system wherein the transmitted signal is spread via a code sequence, such as in a direct-sequence code-division multiple access (DS-CDMA or simply, CDMA) communications system; there is a requirement that the spreading waveform used at the transmitter and the receiver be synchronized. If the spreading waveforms are out of synchronization (even by as small an amount as a single chip (a chip is the smallest transmission unit)), then the receiver's data demodulator may receive insufficient signal energy to reliably detect (and decode) the transmitted data. One cause for lack of synchrony in transmitter and receiver spreading waveforms is code-phase uncertainty.

There are typically two components to code-phase uncertainty. A first component to code-phase uncertainty involves the determination of an initial code phase, commonly referred to as code acquisition or initial acquisition. The code acquisition is normally achieved by a component of a wireless communications device known as the searcher during the initial stages of communications. A second component to code-phase uncertainty is commonly referred to as a code tracking loop. The task of the code tracking loop is to maintain code synchronization after the code acquisition.

A delay lock loop (DLL) is one commonly used algorithm for the code tracking loop. The DLL makes use of a correlation operation between the received signal and two different code phases, an early and a late phase, of the receiver spreading waveform. More advanced DLLs can make use of on-time energy to normalize the early and the late signals. The DLL compares the early signal sample with the late signal sample and if the difference between the two is above a certain threshold, the DLL can then adjust the sampling point in an advance (early) or retard (late) direction.

The wireless communications channel can be modeled by its time and frequency varying impulse response. The communications channel's coherence time and coherence bandwidth can indicate how fast the channel is varying in time and frequency, with the coherence time being related to the Doppler spread (a function of the wireless device's speed) while the coherence bandwidth is related to multipath fading and is a function of the delay spread. For wideband communications systems, such as wideband CDMA (W-CDMA) the delay spread may be inherent due to the short pulse duration of the communications system.

A commonly used technique for processing multipath involves the use of a rake receiver (with multiple fingers), which can process the received signal with a certain multipath delay. A DLL can be implemented in each finger to make each multipath synchronized. With each finger assigned to a multipath, the received signal can be formed by combining the various multipaths, thus improving the quality of the received signal as a whole.

One disadvantage of the prior art is the occurrence of what is known as fat paths, or multiple paths that are close to one another, with a separation of one chip or less. With the multipaths being so close, the decision from the DLL (early, on-time, or late) can be interfered with because adjacent multipath signals may overlap one another. This may result in a loss in the synchrony between transmitter and receiver spreading waveforms.

SUMMARY OF THE INVENTION

These and other problems are generally solved or circumvented, and technical advantages are generally achieved, by preferred embodiments of the present invention which provides for a system and a method for code acquisition using a delay lock loop in the presence of fat paths.

In accordance with a preferred embodiment of the present invention, a method for code tracking in multipath with a plurality of paths using delay lock loops (DLLs), the method comprising assigning a DLL to each path in the multipath, adjusting each DLL to maximize sample strength, placing samples less than a first specified threshold apart into groups, adjusting the DLL assigned to the samples in the groups so that they are greater than the first specified threshold apart, regrouping the groups that are less than a second specified threshold apart, and applying a group decision rule to the regrouped groups is provided.

In accordance with another preferred embodiment of the present invention, a code tracking loop comprising a plurality of tracking fingers coupled to a delay spread estimator, each tracking finger containing circuitry to demodulate a signal at a specified code offset, a plurality of delay lock loops (DLLs) coupled to the delay spread estimator, each DLL containing circuitry to provide a timing adjustment for use in fine tuning the tracking of a signal by a tracking finger to which it is coupled, a group decision unit coupled to the plurality of DLLs, the group decision unit containing circuitry to compute tracking finger adjustment information based upon timing adjustment information provided by the DLLs to ensure that the tracking fingers are demodulating signals that are greater than a specified threshold apart, and a combiner coupled to the plurality of tracking fingers, the combiner containing circuitry to join the demodulated signals produced by the tracking fingers into a single signal is provided.

In accordance with another preferred embodiment of the present invention, a wireless device comprising a radio frequency (RF) block coupled to a signal input, the RF block containing circuitry to filter and amplify a signal provided by the signal input, a code tracking loop coupled to the RF block, the code tracking loop comprising a plurality of tracking fingers coupled to a delay spread estimator, each tracking finger containing circuitry to demodulate a signal at a specified code offset, a plurality of delay lock loops (DLLs) coupled to the delay spread estimator, each DLL containing circuitry to provide a timing adjustment for use in fine tuning the tracking of a signal by a tracking finger to which it is coupled, a group decision unit coupled to the plurality of DLLs, the group decision unit containing circuitry to compute tracking finger adjustment information based upon timing adjustment information provided by the DLLs to ensure that the tracking fingers are demodulating signals that are greater than a specified threshold apart, a combiner coupled to the plurality of tracking fingers, the combiner containing circuitry to join the demodulated signals produced by the tracking fingers into a single signal, the wireless device further comprising a demodulator and decoder coupled to the code tracking loop, the demodulator and decoder containing circuitry to extract a digital data stream from the single signal produced by the code tracking loop is provided.

An advantage of a preferred embodiment of the present invention is that the delay lock loop can make a decision on multipaths that are close to one another. These multipaths can then be combined to help improve the quality of the received signal.

A further advantage of a preferred embodiment of the present invention is that the present invention requires little additional hardware, therefore implementation can be inexpensive in terms of additional engineering. Furthermore, the small amount of additional hardware consumes little additional power, hence, has a small impact upon the battery life of a wireless communications device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely, a direct sequence code-division multiple access (DS-CDMA) compliant wireless communications systems, such as TIA/EIA-95 and CDMA2000 compliant systems. The TIA/EIA-95 technical standard is published in a document entitled "Mobile Station-Base Station Compatibility Standard for Wideband Spread Spectrum Cellular Systems (ANSI/TIA/EIA-95-B-99)," published Feb. 1, 1999, which is herein incorporated by reference. An overview of the CDMA2000 technical standard is provided in a document entitled "Introduction to CDMA2000 Spread Spectrum Systems, Release 0," which is herein incorporated by reference. The invention may also be applied, however, to other wireless communications systems wherein the expected multipath delays may be on the order of a transmission unit. An example of such a system includes UMTS (Universal Mobile Telephony System) compliant communications systems. An overview of the UMTS technical standard is provided in a document entitled "3$^{rd}$ Generation Partnership Project; Technical Specifications Group Services and System Aspects General UMTS Architecture (Release 4)," which is herein incorporated by reference.

Figure 1:
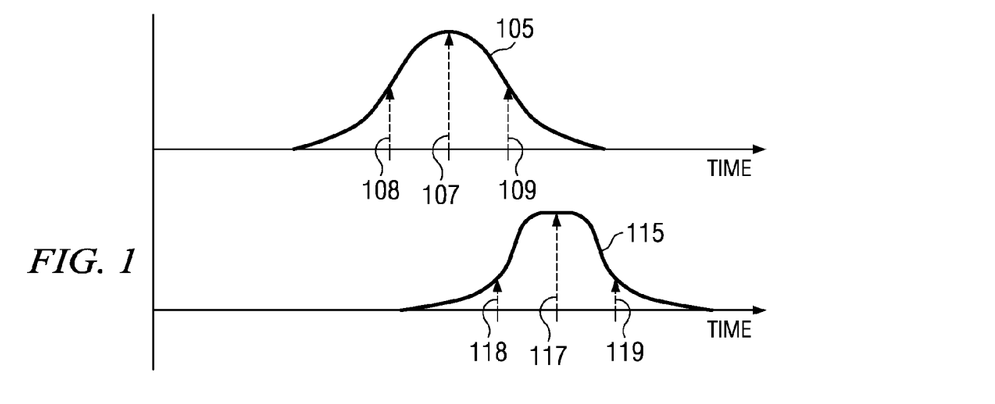
FIG. 1 is a diagram of an exemplary fat path.

With reference now to FIG. 1, there is shown a diagram illustrating an exemplary fat path. FIG. 1 illustrates an exemplary fat path consisting of two paths, a first path 105 and a second path 115. The two paths may be reflections of a transmitted signal that arrive at a receiver at different times due to differences in the distance that each path travels. For example, the first path 105 may have traveled a slightly shorter distance than the second path 115, perhaps due to a smaller number of reflections or perhaps due to the location of the reflector that is closer to either the transmitter or receiver. Regardless of the paths traveled, the first path 105 and the second path 115 arrive at the receiver within a short time of one another.

As described previously, a delay lock loop (DLL) can attempt to correct code-phase uncertainty by examining on-time, early, and late samples of a received signal. For example, in reference to the first path, a sample 107 can be the on-time sample, while sample 108 can represent the early sample and sample 109 can be the late sample. Similarly, samples 117, 118, and 119 can be the on-time, early, and late samples for the second path 115. Note that due to the close proximity of the first path 105 to the second path 115, the late sample 109 of the first path 105 overlaps with the early sample 118 of the second path 115. The overlap can cause confusion in the operation of the DLL since the overlap can alter the values of the samples used in the DLL decision making.

Paths that may be extremely close (less than some specified minimum distance apart) to one another may be processed as a single path to help alleviate the problems associated with overlap. However, paths that may be close to one another but are farther than some minimum distance apart should be processed separately to help improve the quality of the received signal. Unfortunately, with typical DLL processing, these paths can initially be separate but can move closer together and eventually merge into a single path. Additional processing should be provided to keep these paths separated.

Figure 2:
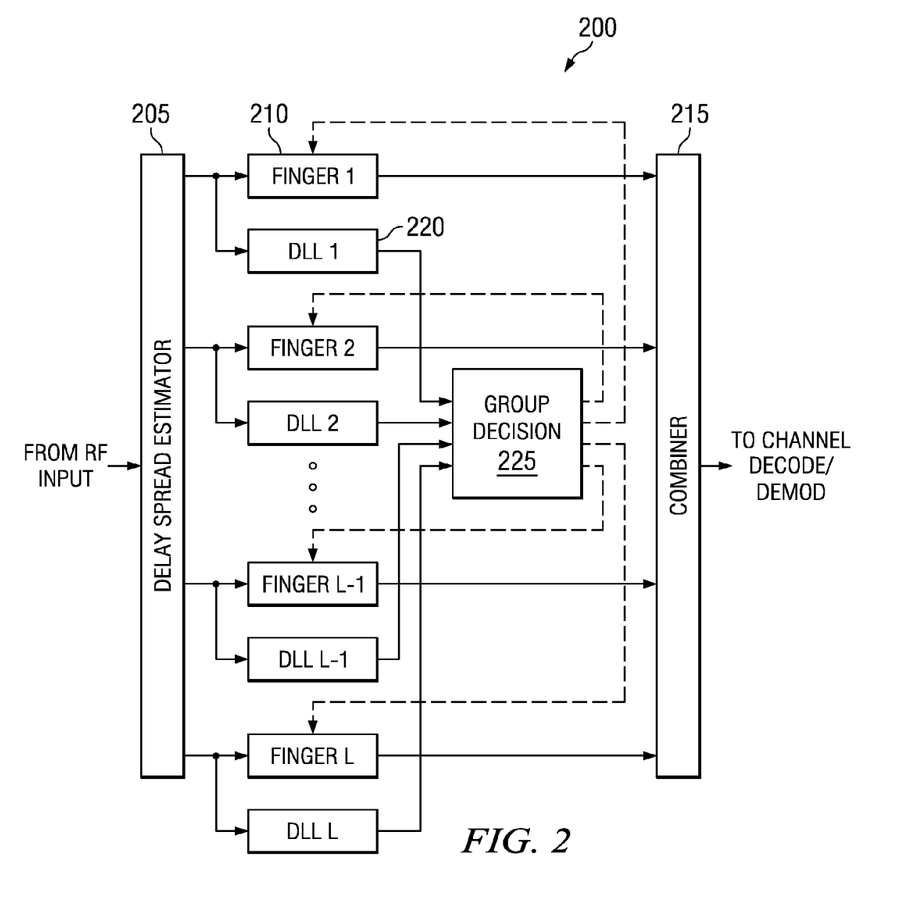
FIG. 2 is a diagram of a code tracking loop with group decision block, according to a preferred embodiment of the present invention.

With reference now to FIG. 2, there is shown a diagram illustrating a code tracking loop 200 using a DLL with group decision, according to a preferred embodiment of the present invention. The code tracking loop 200 displayed in FIG. 2 may be a portion of a wireless device (not shown). The code tracking loop 200 can receive a received signal from a radio frequency (RF) input, such as an antenna (not shown). The received signal may have already received some analog signal processing, such as filtering to remove out-of-band noise and interference and amplification to amplify the received signal to a power level suitable for processing.

The received signal, after filtering and amplification (and possibly other analog signal processing), can then be provided to a delay spread estimator 205. The delay spread estimator 205 can be used to provide a delay spread profile of the communications channel, which may be thought of as a snap-shot of characteristics of the communications channel. For example, if there is multipath in the communications channel, then the delay spread profile can provide information such as the location of the various paths received by the wireless device in terms of code offset or absolute time offset.

Information pertaining to each path in the delay spread profile can be provided to one of a plurality of fingers (such as finger 1 210) in the code tracking loop 200. According to a preferred embodiment of the present invention, there may be as many as L fingers in the code tracking loop 200, with each finger possibly being assigned to a different path. A finger, such as the finger 1 210, may be provided with a code offset corresponding to an assigned path. The finger can then provide samples of the received signal at the provided code offset to a combiner 215. The combiner 215 can use an algorithm such as maximum ratio combining (MRC) to put together the outputs from the various fingers. MRC combines the outputs of the various fingers based on an assigned weight given to each finger, and output from a finger with a larger assigned weight will have more significance than output from a finger with a smaller assigned weight. Other combiner algorithms can be used to combine the outputs from the fingers, such as equal gain combining, wherein each finger's output may be combined with equivalent weight, meaning that no finger output is given more significance than any other. The output of the combiner 215 can be provided to a channel decoder and demodulator (not shown) wherein the received signal can be demodulated to remove spreading codes and so forth applied at the transmitter.

In addition to being provided to the fingers, each path can also be provided to a DLL, such as DLL 1 220. As discussed above, a DLL can be used to track a path. According to a preferred embodiment of the present invention, a DLL (such as the DLL 1 220) can take an on-time, early, and late sample of the path and make a comparison between the three samples. Based on the comparison, the DLL 1 220 can advance (the early sample), retard (the late sample), or make no adjustment (the on-time sample) to the sampling point of the path assigned to the finger 1 210. Note that the amount of adjustment made by the DLL 220 can be optimized based upon performance. For example, in one implementation, a DLL may make 0.50*chip duration adjustments, while in another implementation, a DLL may make 0.25*chip duration adjustments. Furthermore, the adjustment can vary depending upon direction. For example, an advance adjustment may be different from a retard adjustment. Once again, the adjustment amount may differ depending upon implementation.

The adjustment made by the DLL (the output of the DLL) can be provided to a group decision unit 225. According to a preferred embodiment of the present invention, the group decision unit 225 can be used to combine paths together. Paths that are within a certain minimum distance (in chips) from one another can be combined into a single group. This minimum distance can be referred to as a minimum distance separation. Additionally, the group decision unit 225 can be used to ensure that paths maintain the minimum distance separation and to make decisions that can result in better performance. A detailed explanation of the group decision unit 225 is provided below.

Figure 3:
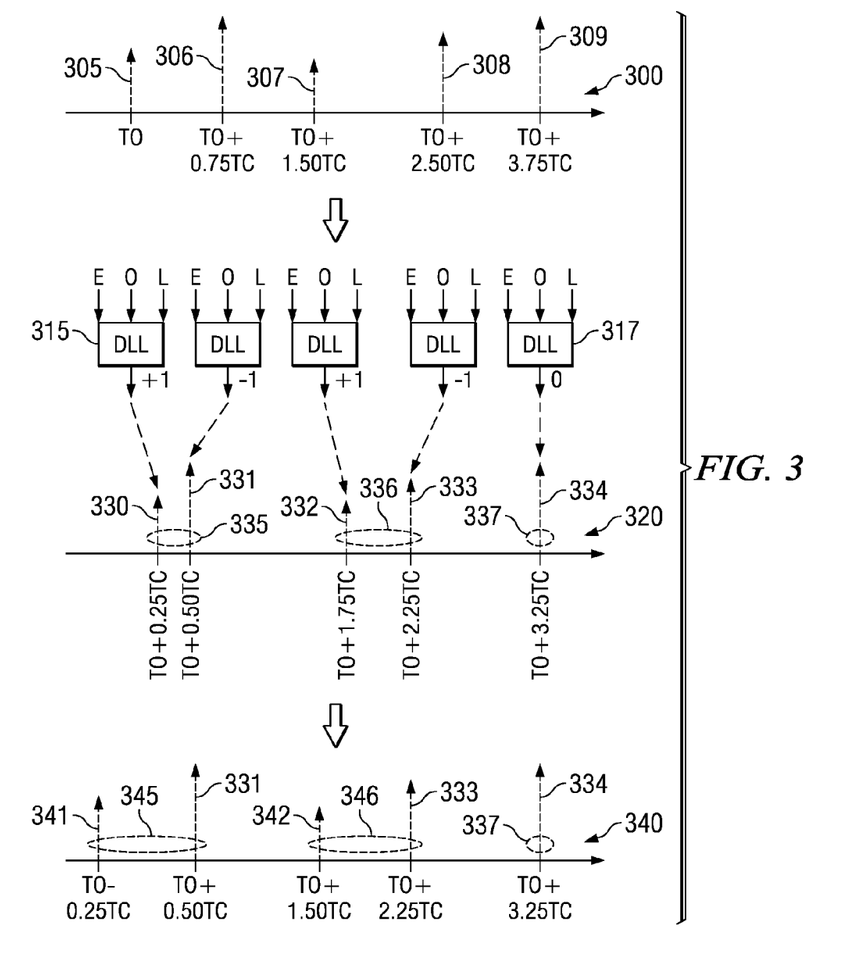
FIG. 3 is a diagram of an exemplary grouping and a group decision, according to a preferred embodiment of the present invention.

With reference now to FIG. 3, there is shown a diagram illustrating an exemplary grouping and a group decision, according to a preferred embodiment of the present invention. The example displayed in FIG. 3 illustrates the formation of groups for a signal which experiences five (5) multipath paths. For discussion purposes, assume that the receiver (not shown) has a sampling rate that is four (4) times faster than the chip rate, Tc, and that the minimum distance separation requirement is specified as 0.75*Tc or ¾ths of a chip. Note that the 0.75*Tc minimum distance separation requirement used in the discussion is an exemplary value for use in discussion purposes and that the minimum distance separation requirement can vary depending upon implementation and can be optimized for performance. The actual value of the minimum distance separation requirement may be dependent upon factors such as sampling rate and fading channel environment.

A first axis 300 displays the five multipath paths: a first path 305 at a time T0, a second path 306 at a time T0+0.75*Tc, a third path 307 at a time T0+1.50*Tc, a fourth path 308 at a time T0+2.50*Tc, and a fifth path 309 at a time T0+3.75*Tc. Clearly, the five paths meet or exceed the minimum distance separation requirement of 0.75*Tc.

Each of the five paths can then be provided to a DLL, such as DLL 315 or DLL 317. Each DLL can examine the on-time, early, and late samples of the paths (shown as O, E, and L in FIG. 3) and then make adjustments to the sampling of the paths based on the samples. Note that since the sampling rate is four times the chip rate, Tc, the early and late samples of a path can be −0.25*Tc and +0.25*Tc relative to the on-time sample. Note once again that the adjustments of 0.50*Tc by a DLL is only for discussion purposes and an actual value may differ based upon implementation. The actual value of the DLL adjustment may be dependent upon factors such as sampling rate and fading channel environment. As discussed previously, the DLL will tend to select the adjustment based upon the sample with the largest magnitude. A second axis 320 displays the adjustments selected by the DLLs.

A first adjusted path 330 corresponds to an adjustment to retard the first path 305 and is located at T0+0.25*Tc, a second adjusted path 331 corresponds to an adjustment to advance the second path 306 and is located at T0+0.50*Tc, a third adjusted path 332 corresponding to an adjustment to retard the third path 307 is located at T0+1.75*Tc, a fourth adjusted path 333 corresponding to an adjustment to advance the fourth path 308 and is located at T0+2.25*Tc, and a fifth adjusted path 334 corresponding to an adjustment to do nothing to the fifth path 309 and is located at T0+3.75*Tc. Note that next to each DLL there is a numeral indicating the adjustment selected by the DLL. For instance, next to the DLL 315 is a +1 that indicates that a retard adjustment was selected, while a 0 next to the DLL 317 indicates that no adjustment was selected. Note that prior to processing by the DLLs, the paths met the minimum distance separation requirement of at least 0.75*Tc, but after adjustment by the DLLs, some of the adjusted paths no longer meet the minimum distance separation requirement.

After processing by the DLLs, there may be paths that once met the minimum distance separation requirement but may no longer do so (and vice versa). Additional processing may be required to ensure that the minimum distance separation requirement is met. A first step in the additional processing can be the grouping of the adjusted paths that are within the minimum distance separation requirement of one another. For example, in FIG. 3, the first and second adjusted paths 330 and 331 may be grouped into a first group 335 and the third and fourth adjusted paths 332 and 333 may be grouped into a second group 336. The fifth adjusted path 334, since it is the only remaining adjusted path, it is placed by itself into a third group 337.

After grouping the adjusted paths into groups, the paths in each of the groups can be adjusted to ensure that they meet the minimum distance separation requirement. A third axis 340 displays one possible adjustment to the groups to ensure that they meet the minimum distance separation requirement. According to a preferred embodiment of the present invention, one way to adjust the paths within a group may be to fix the location of the path with the largest magnitude and adjust the remaining paths to ensure that they meet the minimum distance separation requirement. One reason to fix the location of the path with the largest magnitude may be that since it is the largest path, it may have the most significance and for performance reasons, it may be best to leave it where it is currently located. If there is more than one path with the largest magnitude, then the fixed path may be randomly selected or the path that is furthest away from the other paths may be fixed. Similarly, a path with a smaller magnitude has a smaller amount of significance and therefore it may be better for overall performance to move that path so that any magnitude reduction will be seen on the smaller path.

Applying the above path adjustment strategy, the first adjusted path 330 (formerly at T0+0.25*Tc) can be adjusted to a path 341 located at T0−0.25*Tc. Note that the adjustments in the paths may still have to fall within the adjustment parameters of the DLLs. The two paths in the group 345 now meet the minimum distance separation requirement. Similarly, the third adjusted path 332 in group 336 can be adjusted from T0+1.75*Tc to T0+1.50*Tc (path 342). Now, each path meets the minimum distance separation requirement.

In addition to paths having to meet the minimum distance separation requirement, groups of paths may also have to meet the minimum distance separation requirement. Note that it may be possible that the minimum distance separation requirement for groups to may be different from the minimum distance separation requirement for paths, however, they do not have to be different.

Figure 4:
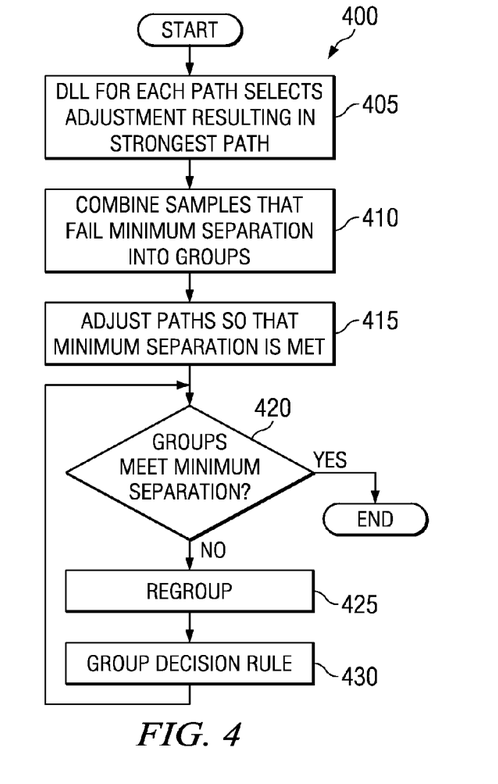
FIG. 4 is a flow diagram of a sequence of operations for processing paths and groups to ensure that minimum distance separation is maintained for both paths and groups, according to a preferred embodiment of the present invention.

With reference now to FIG. 4, there is shown a flow diagram illustrating a sequence of operations 400 for the processing of paths and groups to ensure that minimum distance separation is maintained for both paths and groups, according to a preferred embodiment of the present invention. The sequence of operations 400 can begin with the DLLs for each finger in a code tracking loop (such as the code tracking loop 200 (FIG. 2)) selecting the adjustment (on-time, early, or late) that results in the strongest path (block 405). Then using the adjustments provided by the DLLs, the adjusted paths that lie within the minimum distance separation requirement can be placed into groups (block 410).

The paths in the groups (formed previously) can then be adjusted so that the paths within each group meet the minimum distance separation requirement (block 415). An algorithm that can be used to adjust the paths is to fix the location of the path with the largest magnitude and then move the path(s) with the lesser magnitudes until the minimum distance separation requirement is met. The adjustment algorithm may be iterative in nature so that if the minimum distance separation requirement is not met initially, it may be met in subsequent passes. After the paths in the individual groups meet the minimum distance separation requirement, the groups themselves may be checked to see if they meet the minimum distance separation requirement (block 420). Note that as discussed above, the minimum distance separation requirement for groups may differ from the requirement for paths, although they may be the same.

If the groups meet minimum distance separation, then the sequence of operations 400 is complete. However, if the groups do not meet minimum distance separation, then the groups may need to be regrouped (block 425). According to a preferred embodiment of the present invention, the regrouping involves only the groups that fail the minimum distance separation requirement. Alternatively, the regrouping may simply start with all of the paths in all of the groups. After the regrouping (block 425), a group decision rule may be applied to make adjustments to the paths (block 430). Several different examples of group decision rules will be discussed below. After the application of the group decision rule and the subsequent adjustment of the paths, the groups can be checked to see if the minimum distance separation requirement is met (block 420). The regrouping and the application of the group decision rule may be repeated until the minimum distance separation requirement is met.

Figure 5:
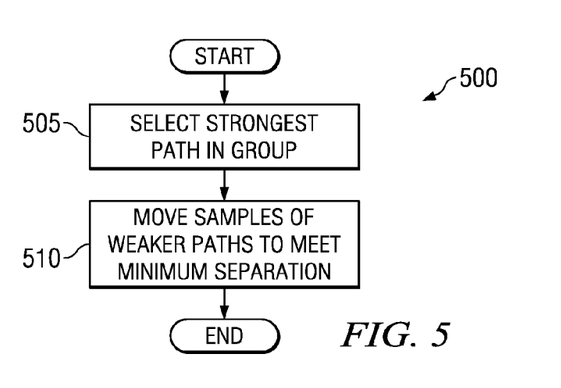
FIG. 5 is a flow diagram of a strongest-follow group decision (SFGD), according to a preferred embodiment of the present invention.

With reference now to FIG. 5, there is shown a flow diagram illustrating an algorithm 500 referred to as strongest-follow group decision (SFGD), according to a preferred embodiment of the present invention. In SFGD, the group decision may be based upon the position of the strongest path in the group. The algorithm 500, which may execute in a group decision unit (such as the group decision unit 225 (FIG. 2)) of a code tracking loop 200 (FIG. 2), may begin the group decision process with the group decision unit 225 selecting a path within a group that has the largest magnitude (block 505). If there are multiple paths with the same (or essentially the same) magnitude, the group decision unit 225 may randomly select one of the paths with the same magnitude. Alternatively, the group decision unit 225 may make a decision on the path to select based on the proximity of the paths to other paths within the group (i.e., the path selected may be the furthest from the other paths in the group) and to other groups that may be adjacent to the path.

After selecting the path with the greatest magnitude (block 505) or using a decision making process if there is more than one path with essentially the same magnitude, the group decision unit 225 can adjust the DLL settings for the remaining paths in the group so that the minimum distance separation requirement is met (block 510). After completing one group, the group decision unit 225 can repeat the group decision for other groups.

For illustrative purposes, refer back to FIG. 3, wherein there are shown five paths: path 1 305 located at T0, path 2 306 located at T0+0.75*Tc, path 3 307 located at T0+1.50*Tc, path 4 308 located at T0+2.50*Tc, and path 5 309 located at T0+3.75*Tc. For discussion purposes, let the minimum distance separation requirement be set at 0.75*Tc and the sampling rate be four (4) times the chip rate. After an initial set of adjustments by DLLs assigned to the five paths, wherein each of the DLLs makes an adjustment to the paths to maximize path strength, the five paths can be placed into three groups: group 1 335 containing adjusted path 1 330 and path 2 331, group 2 336 containing adjusted path 3 332 and path 4 333, and group 3 337 containing adjusted path 5 334.

After grouping, the paths can be sent to the group decision unit 225 for processing. When the group decision unit 225 processes group 1 335, it may determine that the adjusted path 2 331 has a larger magnitude than the adjusted path 1 330. Therefore, it can elect to fix the position of the adjusted path 2 331 and move the adjusted path 1 330, with the results displayed as a modified group 1 345 wherein the adjusted path 2 331 remains at position T0+0.50*Tc (the same position in group 1 335) while the adjusted path 1 330 (displayed as modified path 1 341) has been moved to T0−0.25*Tc. The groups 336 and 337 undergo similar processing. Note that after undergoing processing by the group decision unit 225, the paths no longer violate the minimum distance separation requirement.

Note however, that although the paths within the groups may meet the minimum distance separation requirement, the groups themselves may not. Additional processing, such as described in algorithm 400 (FIG. 4) may be required to ensure that both the paths and the groups meet their respective minimum distance separation requirements.

Figure 6A:
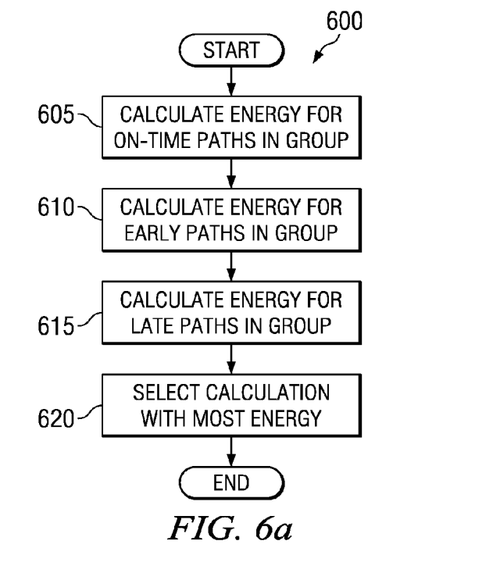
FIGS. 6a and 6b are diagrams of a maximum energy group decision (MEGD) and an application of MEGD to an exemplary set of paths, according to a preferred embodiment of the present invention.

With reference now to FIG. 6a, there is shown a flow diagram illustrating an algorithm 600 referred to as maximum energy group decision (MEGD), according to a preferred embodiment of the present invention. In SFGD (discussed above), the group decision may have been based on the energy measurements of the on-time samples of the paths, with the early and late samples being ignored in the decision making process. In MEGD, the energies of the early, on-time, and late samples of the paths can all be considered. According to a preferred embodiment of the present invention, the application of the MEGD algorithm 600 may take place subsequent to a grouping of the paths via a grouping algorithm such as described previously. For example, after an initial adjustment by the DLLs assigned to each path, the adjusted paths may be grouped according to the minimum distance separation requirement.

Once again, the MEGD algorithm 600 may execute on a group decision unit, such as the group decision unit 225 (FIG. 2). The group decision unit 225 may begin operations by determining (calculating) an energy level for all on-time samples of paths within a group (block 605). This may involve interpolation of certain samples if the samples do not exist. Linear interpolation, performed by drawing a line between two samples adjacent to the missing sample, may be used to estimate the value of the missing sample. Alternatively, more accurate interpolation using higher order techniques may be used to provide a better estimate of the missing sample. After interpolation, the samples may be simply added together to provide the energy level. Alternatively, a weighted combination of the samples may be used, to put lesser emphasis on interpolated samples for example.

After determining the energy level for the on-time samples, the group decision unit 225 may also determine the energy levels for the early (block 610) and late (block 615) samples. As before, the determination of the energy levels for the early and late samples may involve the use of an interpolation technique to provide an estimate for a missing sample. Once the energy levels for the on-time, early, and late samples have been determined, the group decision unit 225 may select the adjustment that may result in the largest determined energy level (block 620). Any remaining groups can be processed in a similar fashion.

Figure 6B:
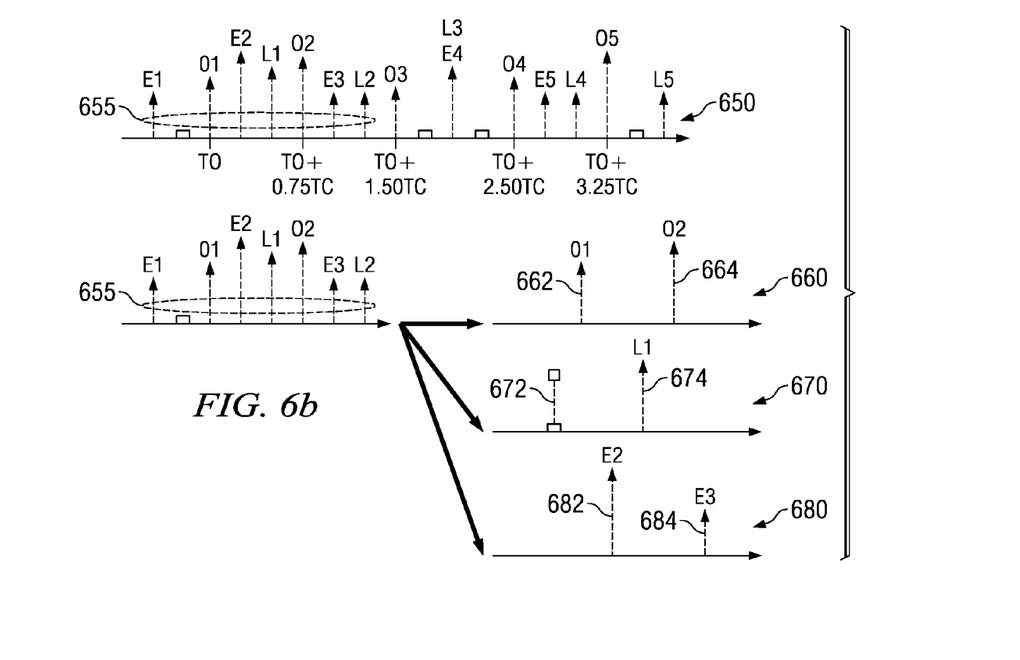

With reference now to FIG. 6b, there is shown a diagram illustrating an application of the MEGD algorithm 600 on an exemplary set of paths, according to a preferred embodiment of the present invention. For discussion purposes, an axis 650 displays a sequence of samples of paths. Displayed samples include on-time, early, and late samples of a plurality of paths. Let the discussion focus upon a single group 655 of paths. The group 655 may contain several samples, including: for path 1, an early sample E1, an on-time sample O1, a late sample L1; for path 2, an early sample E2, an on-time sample O2, a late sample L2; for path 3, an early sample E3.

Axes 660, 670, and 680 show three possible movements that can still maintain the minimum distance separation requirement. The axis 660 displays on-time samples of path 1 (O1 662) and path 2 (O2 664). The axis 670 displays a late sample of path 1 (L1 674) along with an interpolated sample 672 representing a sample position with no available sample. The axis 680 displays early samples of path 2 (E2 682) and path 3 (E3 684). For purposes of illustration, let the samples have the following values: E1=0.7; O1=1; L1=1.2; E2=1.4; O2=1.3; L2=0.6; and E3=0.7. Then, the energy level for the samples in the axis 660 may be O1+O2=2.3; for axis 670, the energy level may be (E1+O1)/2+L1=2.05 wherein a simple linear interpolation formula may be used for determining the magnitude of the interpolated sample 672; for the axis 680, the energy level may be E2+E3=2.1. With those determined energy levels, the adjustment shown in the axis 680 results in the maximum energy and is the adjustment chosen.

Figure 7:
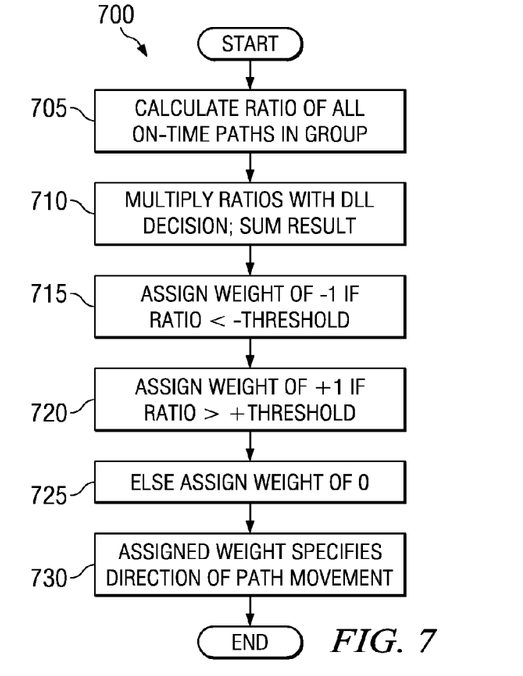
FIG. 7 is a flow diagram of a ratio based on-time group decision (ROGD), according to a preferred embodiment of the present invention.

With reference now to FIG. 7, there is shown a flow diagram illustrating an algorithm 700 referred to as ratio based on-time group decision (ROGD), according to a preferred embodiment of the present invention. SFGD makes use of only the on-time samples of paths in the group decision process and therefore can be performed quickly with very little computational requirements. MEGD can make use of all available samples and may be able to produce a better group decision with a higher computational requirement, especially if higher order interpolation techniques are employed. In ROGD, on-time samples of paths can be used to compute a ratio, thereby providing a measure of the relative magnitudes of the on-time samples.

As before, the ROGD algorithm 700 may execute on a group decision unit, such as the group decision unit 225 (FIG. 2). The group decision unit 225 may begin operations by calculating a ratio (also commonly referred to as a weight) for all on-time samples of paths within a group (block 705). The group decision unit 225 may begin operation after a grouping of the paths. A ratio for a given on-time sample may be calculated using the expression:

$$w = \frac{\text{magnitude\_of\_sample}}{\text{sum\_of\_magnitues\_of\_all\_samples}}.$$

For example, in a group with two on-time samples, O1 and O2, then a weight for the sample O1 may be calculated as $MAG_{O1}/(MAG_{O1}+MAG_{O2})$.

After determining the ratios (weights) for each on-time sample, the group decision unit 225 may then multiply the ratios with the DLL decision for each path during an initial processing performed by the DLL assigned to each path (such as in block 405 of FIG. 4) to produce a weighted value (block 710), wherein if the DLL chose to retard a path (choosing a late sample), the multiplier can be a +1, if the DLL chose to advance a path (choosing an early sample), the multiplier can be a −1, and if the DLL chose to do nothing (choosing an on-time sample), then the multiplier can be a 0.

The weighted value computed in block 710 may then be compared with a pair of thresholds (blocks 715, 720, and 725). If the weighted value is less than a first threshold, for example, −0.5, then the group decision unit 225 may set an assigned weight to a negative value (for example, −1). If the weighted value is greater than a second threshold, for example, 0.5, then the group decision unit 225 may set the assigned weight to a positive value (for example, 1). If the weighted value is between the first and the second thresholds, for example, −0.5 and 0.5, then the group decision unit 225 may set the assigned weight to a zero value.

With the assigned weight set, the group decision unit 225 can permit adjustments of samples in a direction that is consistent with the value of the assigned weight (block 730). For example, if the assigned weight is set at a negative value, then the group decision unit 225 may only permit adjustments to advance the paths within the group. If the assigned weight is set to a positive value, then the group decision unit 225 may only permit adjustments to retard the paths within the group. If the assigned weight is set to a zero value, then the group decision unit 225 may not permit any adjustments to the paths within the group. Any remaining groups can be processed in a similar fashion.

Figure 8:
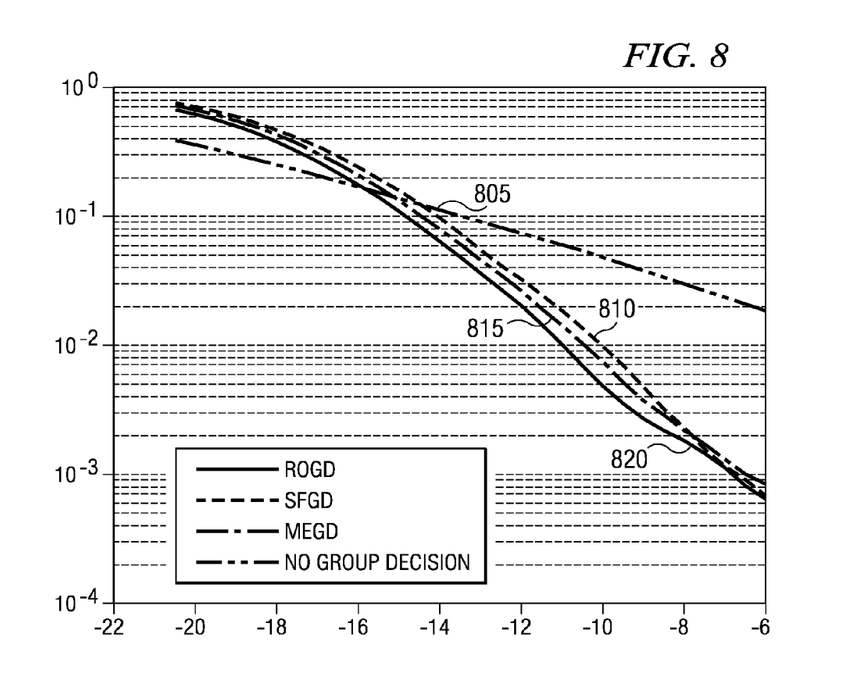
FIG. 8 is a data plot comparing the performance of several group decision algorithms, according to a preferred embodiment of the present invention.

With reference now to FIG. 8, there is shown a data plot illustrating and comparing the performance of several different group decision algorithms, according to a preferred embodiment of the present invention. The data plot illustrates the block error rates versus total transmitted power (Ec) multiplied with noise power (Io) for the three different group decision algorithms discussed above. Additionally, the data plot also displays the block error rate with no group decision algorithm. A first curve 805 displays the case with no group decision algorithm, a second curve 810 displays the case with the SFGD group decision algorithm, a third curve 815 displays the case with the MEGD group decision algorithm, and a fourth curve 820 displays the case with the ROGD group decision algorithm.

The data plot shows that for low values of Ec*Io, the first curve 805 (no group decision algorithm) has a better block error rate than any of the group decision algorithms. This may be due to the fact that at such low values of Ec*Io, there may not be any multipath diversity used to obtain any performance increase when using any of the group decision algorithms. However, as Ec*Io increases, the performance improvements of the group decision algorithms are clearly evident, with ROGD performing better than both MEGD and SFGD.

Figure 9:
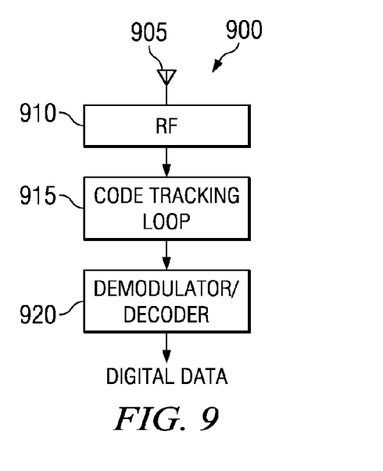
FIG. 9 is a diagram of a wireless device with a code tracking loop with group decision, according to a preferred embodiment of the present invention.

With reference now to FIG. 9, there is shown a diagram illustrating a wireless device 900 with a code tracking loop 915 featuring a delay lock loop and a group decision rule to improve code tracking, according to a preferred embodiment of the present invention. The wireless device 900 receives a signal that may have been transmitted over-the-air via an antenna 905. The signal received by the antenna 905 may have multipath due to the operating environment of the wireless device 900. The received signal may then be provided to a radio frequency block 910, wherein the received signal may be filtered to remove out-of-band interference and amplified to bring the received signal to a power level that is compatible with circuitry in the remainder of the wireless device 900.

After filtering and amplification, the received signal may be provided to the code tracking loop 915. The code tracking loop 915 may be responsible for providing a delay spread profile of the communications channel, which can provide a view of the multipath that may exist in the received signal. The code tracking loop 915 may then assign fingers of a rake receiver (not shown) to each of the paths in the multipath. Each finger can be responsible for extracting the received signal from its assigned path. Each finger's version of the received signal can then be combined to produce a single copy of the received signal that may be stronger and of higher quality than any single version of the received signal. Each finger may also have a delay lock loop (not shown) to help maximize the quality of the received signal being extracted by the finger. Finally, a group decision block (not shown) can be used to mitigate any problems that may arise if paths in the multipath are too close together. A more detailed explanation of the operation of the code tracking loop was provided above, in conjunction with the discussion of FIG. 2. After each finger's version of the received signal is combined into a single received signal, the received signal can be provided to a demodulator and decoder 920 wherein the received signal can have any modulation and encoding (which was applied prior to transmission) removed, producing a digital data stream that can be used by devices (not shown) which may be attached to the wireless receiver 900.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for code tracking in multipath with a plurality of paths using delay lock loops (DLLs), the method comprising:
   assigning a DLL to each path in the multipath;
   adjusting each DLL to maximize a strength of samples in each path;
   placing paths having samples less than a first specified distance threshold apart into groups;
   adjusting the DLL assigned to each path in the groups so that samples from paths in the group are greater than the first specified distance threshold apart, wherein adjusting the DLL comprises:
      fixing a location for a path having samples with a largest magnitude in the group; and
      adjusting the DLLs of other paths so that the samples of the other paths are greater than the first specified distance threshold apart;

regrouping the groups that are less than a second specified threshold distance apart; and applying a group decision rule to the regrouped groups.

2. The method of claim 1 further comprising repeating the regrouping and applying until the groups are greater than the second specified threshold apart.

3. The method of claim 2, wherein the first and the second specified thresholds are equal.

4. The method of claim 1, wherein the first adjusting comprises a DLL choosing to advance, retard, or make no adjustment to the path.

5. The method of claim 4, wherein there can be multiple advance and retard adjustments.

6. The method of claim 4, wherein the advance adjustment is an early sample, the retard adjustment is a late sample, and no adjustment is an on-time sample of the path.

7. The method of claim 1, wherein if there is more than one sample with the largest magnitude, then the sample furthest away from other samples in the group should be fixed.

8. The method of claim 1, wherein if there is more than one sample with the largest magnitude, then a sample is randomly fixed.

9. The method of claim 1, wherein the regrouping comprises joining the groups into a single group.

10. The method of claim 1, wherein the applying of the group decision rule comprises:
for each group,
selecting a path with the largest magnitude; and
moving the remaining paths so that the paths are greater than the second specified threshold apart.

11. The method of claim 10, wherein the paths used in the group decision rule are on-time paths.

12. The method of claim 1, wherein the applying of the group decision rule comprises:
for each group,
calculating a first energy for on-time paths;
calculating a second energy for early paths;
calculating a third energy for late paths; and
adjusting the paths in a direction resulting in the largest calculated energy.

13. The method of claim 12, wherein if there is more than one largest calculated energy, then the adjustment can be randomly selected along a direction resulting in the largest calculated energy.

14. The method of claim 12, wherein interpolation can be used to estimate values of paths which are missing.

15. The method of claim 14, wherein the interpolation is linear interpolation.

16. The method of claim 1, wherein the applying of the group decision rule comprises:
for each group,
calculating a ratio for each on-time path;
summing each ratio multiplied with its associated DLL adjustment;
assigning a weight based on a comparison of the summed value with specified thresholds; and
permitting adjustments only in a direction consistent with the weight.

17. The method of claim 16, wherein the calculating of a ratio can be expressed mathematically as:

$$w = \frac{\text{magnitude\_of\_sample}}{\text{sum\_of\_magnitues\_of\_all\_samples}}.$$

18. The method of claim 16, wherein a ratio is multiplied with a +1 if its associated DLL adjustment is a retarding of the timing, wherein a ratio is multiplied with a −1 if its associated DLL adjustment is an advancement of the timing, and wherein the ratio is multiplied with a 0 if its associated DLL adjustment is no change in the timing.

19. The method of claim 16, wherein the summed value is compared with two specified thresholds.

20. The method of claim 19, wherein the weight is assigned a negative value if the summed value is less than a third specified threshold and the weight is assigned a positive value if the summed value is less than a fourth specified threshold.

21. The method of claim 20, wherein the third specified threshold is equal to the negative of the fourth specified threshold.

22. The method of claim 20, wherein the weight is assigned a zero value if the summed value is between the third and the fourth specified thresholds.

23. The method of claim 16, wherein if the weight is a negative value, only retarding the DLL timing is permitted, wherein if the weight is a positive value, only advancing the DLL timing is permitted.

24. The method of claim 23, wherein if the weight is a zero value, then no adjustments to the DLL timing is permitted.

25. A code tracking loop comprising:
a plurality of tracking fingers coupled to a delay spread estimator, each tracking finger containing circuitry to demodulate a signal at a specified code offset;
a plurality of delay lock loops (DLLs) coupled to the delay spread estimator, each DLL containing circuitry to provide a timing adjustment for use in fine tuning the tracking of a signal by a tracking finger to which it is coupled;
a group decision unit coupled to the plurality of DLLs, the group decision unit containing circuitry to compute tracking finger adjustment information based upon timing adjustment information provided by the DLLs to ensure that the tracking fingers are demodulating signals that are greater than a specified threshold apart, wherein the group decision unit:
selects a signal with the largest magnitude; and
adjusts the DLLs for the remaining signals so that the signals are greater than the specified threshold apart; regrouping the groups that are less than a second specified threshold distance apart; and applying a group decision rule to the regrouped groups; and
a combiner coupled to the plurality of tracking fingers, the combiner containing circuitry to join the demodulated signals produced by the tracking fingers into a single signal.

26. The code tracking loop of claim 25, wherein the group decision unit provides tracking adjustment information to each of the tracking fingers.

27. The code tracking loop of claim 26, wherein the tracking adjustment information is based upon timing adjustment information from each DLL in the code tracking loop.

28. The code tracking loop of claim 26, wherein the group decision unit can modify the timing adjustment information provided by the DLLs for signals that are less than the specified threshold apart.

29. A wireless device comprising:
a radio frequency (RF) block coupled to a signal input, the RF block containing circuitry to filter and amplify a signal provided by the signal input;

a code tracking loop coupled to the RF block, the code tracking loop comprising
  a plurality of tracking fingers coupled to a delay spread estimator, each tracking finger containing circuitry to demodulate a signal at a specified code offset;
  a plurality of delay lock loops (DLLs) coupled to the delay spread estimator, each DLL containing circuitry to provide a timing adjustment for use in fine tuning the tracking of a signal by a tracking finger to which it is coupled;
  a group decision unit coupled to the plurality of DLLs, the group decision unit containing circuitry to compute tracking finger adjustment information based upon timing adjustment information provided by the DLLs to ensure that the tracking fingers are demodulating signals that are greater than a specified threshold apart, wherein the group decision unit:
  selects a signal with the largest magnitude; and
  adjusts the DLLs for the remaining signals so that the signals are greater than the specified threshold apart; regrouping the groups that are less than a second specified threshold distance apart; and applying a group decision rule to the regrouped groups;
  a combiner coupled to the plurality of tracking fingers, the combiner containing circuitry to join the demodulated signals produced by the tracking fingers into a single signal; and
the wireless device further comprising
  a demodulator and decoder coupled to the code tracking loop, the demodulator and decoder containing circuitry to extract a digital data stream from the single signal produced by the code tracking loop.

30. The wireless device of claim 29, wherein the wireless device is used in a direct sequence code-division multiple access (DS-CDMA) communications network.

31. The wireless device of claim 30, wherein the DS-CDMA communications network is a TIA/EIA-95 compliant network.

32. The wireless device of claim 30, wherein the DS-CDMA communications network is a CDMA2000 compliant network.

33. The wireless device of claim 30, wherein the DS-CDMA communications network is a UMTS (Universal Mobile Telephony System) compliant network.

* * * * *